(12) United States Patent
Wheeler et al.

(10) Patent No.: US 6,795,819 B2
(45) Date of Patent: *Sep. 21, 2004

(54) SYSTEM AND METHOD FOR BUILDING AND MAINTAINING A DATABASE

(75) Inventors: David B. Wheeler, Austin, TX (US); Steven C. Wotring, Austin, TX (US)

(73) Assignee: Infoglide Corporation, Austin, TX (US)

( * ) Notice: Subject to any disclaimer, the term of this patent is extended or adjusted under 35 U.S.C. 154(b) by 358 days.

This patent is subject to a terminal disclaimer.

(21) Appl. No.: 09/682,190

(22) Filed: Aug. 3, 2001

(65) Prior Publication Data

US 2002/0035555 A1 Mar. 21, 2002

Related U.S. Application Data

(60) Provisional application No. 60/223,085, filed on Aug. 4, 2000.

(51) Int. Cl.[7] ............................................. G06F 17/30
(52) U.S. Cl. ...................... 707/3; 707/2; 707/4; 707/5
(58) Field of Search ......................... 707/10, 5, 6, 102, 707/104.1, 3, 4, 2; 705/1; 706/2

(56) References Cited

U.S. PATENT DOCUMENTS

| | | | | |
|---|---|---|---|---|
| 5,297,280 A | * | 3/1994 | Potts et al. ..................... | 707/5 |
| 5,897,627 A | * | 4/1999 | Leivian et al. ................. | 706/12 |
| 6,161,107 A | * | 12/2000 | Stern ........................ | 707/104.1 |
| 6,334,129 B1 | * | 12/2001 | Kiyoki et al. ................... | 707/5 |
| 6,374,252 B1 | * | 4/2002 | Althoff et al. .............. | 707/102 |
| 6,578,031 B1 | * | 6/2003 | Washizawa .................... | 707/6 |
| 6,618,727 B1 | * | 9/2003 | Wheeler et al. .............. | 707/10 |

FOREIGN PATENT DOCUMENTS

| | | | | |
|---|---|---|---|---|
| EP | 020994 | * | 12/1986 | ........... G06F/15/40 |
| EP | 0601550 A2 | * | 6/1994 | ......... G06F/15/403 |
| WO | WO99/23584 | * | 5/1999 | ........... G06F/17/30 |

* cited by examiner

*Primary Examiner*—Frantz Coby
(74) *Attorney, Agent, or Firm*—Taylor Russell & Russell, P.C.

(57) ABSTRACT

The invention relates generally to similarity scoring engines. More particularly, the invention is a computer-implemented similarity scoring system and method that allows for using similarity scoring to store and maintain a unique product and retailer inventory database in a database. It enables users of a database management system to be presented with data that maintains a high level of accuracy and reliability and minimizes the occurrences of redundant data. Users of the databases may then be presented with unique instances of data rather than product and inventory data that appears to be different but are actually duplicates of data already entered into the database.

37 Claims, 13 Drawing Sheets

SYSTEM AND METHOD FOR BUILDING AND MAINTAINING A DATABASE

CROSS REFERENCE TO RELATED APPLICATIONS

REFERENCED-APPLICATIONS

This application claims the benefit of U.S. Provisional Application No. 60/223,085, filed on Aug. 4, 2000.

BACKGROUND OF INVENTION

The present invention relates generally to search engines. More particularly, the invention is a computer-implemented search system and method that makes use of searching to build and maintain a database. The invention allows users of the database to be presented with data that maintains a high level of accuracy and reliability and minimizes the occurrences of redundant data. Users of the databases may then be presented with unique instances of data rather than data elements that appear to be different but are actually duplicates of data elements already entered into the database.

Modern information resources, including data found on global information networks, form large databases that need to be searched to extract useful information. Existing database searching technology provides the capability to search through these databases. It is also important to be able to search for a value or item in a database within its particular data context to reduce the number of irrelevant "matches" reported by a database searching program. Traditional search methods of exact, partial and range retrieval paradigms fail to satisfy the content-based retrieval needs of many emerging data processing applications.

Databases of all sizes containing data elements constantly need to be updated to include new data elements or updated information about existing data elements. The information may be single data elements that need to be added to the database or data feeds containing multiple data elements. This is important for many different applications for which databases are used but is especially important in maintaining large databases that contain manufacturing or consumer product databases, employee data for large companies, or any other type of database where data feeds of updated and new data needs to be entered on a daily or even more frequent basis. The data feeds need to be examined to determine if the data is new or updated, or if it already exists in the target databases.

Manufacturers and retailers often refer to the same product by using different product identifiers such as product description, category, and identification numbers. This can cause confusion when attempting to build a database of unique products because entries for products are often repeated in a database and appear to be unique products or inventory when they are not. Because the entries may not be exact matches, traditional database search methods fail to satisfy content-based retrieval needs for comparing a product to an existing database to determine if it is already entered into that database. The process of examining product entries and comparing them to a database to determine if they should be added to the database or likewise removing redundant entries from a database has traditionally been accomplished by either manually examining the entries or by using a computer program to attempt to identify the same products. In most cases, it is accomplished by a combination of a using a computer program to generate a list of potential duplicate candidates followed by a manual examination of those candidates. Since the product and inventory databases are often very large, both the computerized process and the manual process can take a long time.

SUMMARY OF INVENTION

The present invention uses similarity-scoring techniques to identify redundant database content. For example, search techniques may be used to identify products and inventory that may have different product (or inventor) description categories, identification numbers and the like, but are actually the same product or inventory. The present invention provides for using optimized comparisons to allow a unique database to be maintained by reducing or eliminating redundant entries.

Comparisons are used to determine new or updated products to an existing unique product taxonomy database that holds information. A comparison is performed on the new or updated data to the existing database to determine if the product is unique, not unique, or is a possible duplicate product match. The hierarchical database may be divided into distinct taxonomy fragments, or categories, such as pertaining to retail electronic commerce. If the product is unique, it may be entered in the database.

The method of storing and maintaining a unique product and inventory database allows a database to be used in commerce where multiple manufacturer and retailers are involved. When joining data from multiple data sources, there is a need to maintain a unique, non-redundant collection of data, due to variations in product identity between manufacturers and retailers. The present invention is a method for maintaining a manufacturer and retailer inventory database so that unique data can be retrieved from the database. The collection of unique data aids the eventual consumer in identifying the similarities and differences between unique manufacturer products and the consumer retail organizations that supply the products.

An embodiment of the invention is a computer implemented method for combining data elements to build and maintain a unique database comprised of data entries, which comprises using at least one candidate data element that is a candidate to be added to existing data elements in the unique database, performing a comparison between the candidate data element and the existing data elements in the unique database, and computing a similarity score that represents a similarity between the at least one candidate data element and the existing data elements in the unique database. The method may further comprise determining if the candidate data element should be entered into the unique database based on the similarity score. The method may further comprise rejecting the candidate data element for entry into the unique database if the similarity score is greater than a similarity score threshold. The method may further comprising selecting the candidate data element as a candidate for entry into the unique database if the similarity score is equal to or less than a similarity score threshold. The candidate data element may be entered into the unique database. The computing a similarity score may comprise separating the unique database into at least one selected category, developing a schema for the selected categories, assigning the candidate data element to at least one of the selected categories, formulating a similarity score command for each candidate data element based on the selected categories to which the candidate data element belongs, sending the similarity score command to a similarity score function, and performing a search using the score command and the unique database whereby a similarity score result is returned from the search function that represents the similarity score between the at least one candidate data element and the existing data elements in the unique database.

Another embodiment of the invention may be a computer-readable media containing instructions for controlling a computer system to implement the method described above.

Another embodiment of the invention is a system for combining data elements to build and maintain a unique database, which comprises candidate data elements, unique data elements contained in a database, a similar scoring engine for comparing the candidate data elements with the unique data elements and means for entering the candidate data elements into the database based on the comparison of the similar scoring engine. The candidate data elements may be entered into the database if the similar scoring engine determines a similarity score result set that is less than or equal to a predetermined threshold value. The system may further comprise means for performing a secondary similar score validation check on the candidate data elements prior to entering the candidate data elements into the database. The candidate data elements may be entered into the database if the similar scoring engine determines a similarity score result set that is less than or equal to a predetermined threshold value.

The present invention, which relies on similarity scoring, solves the aforementioned needs. The present invention comprises computer-readable media having computer-executable instructions for performing the methods as above.

BRIEF DESCRIPTION OF DRAWINGS

These and other features, aspects and advantages of the present invention will become better understood with regard to the following description, appended claims and accompanying drawings where:

DETAILED DESCRIPTION

Figure 1A:
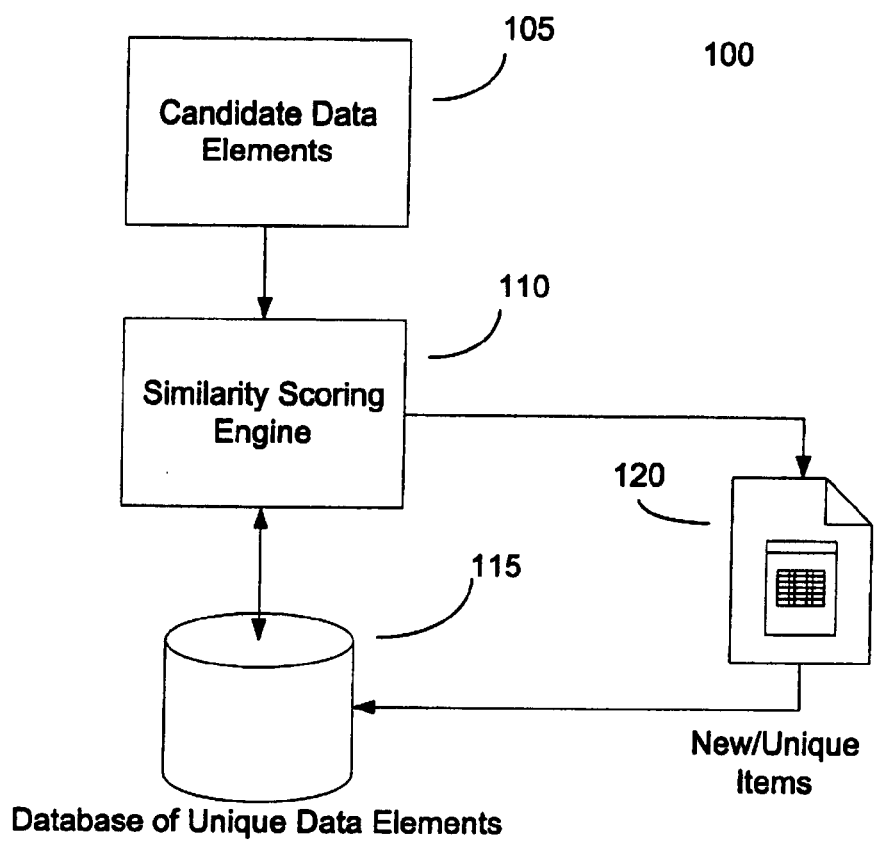
FIG. 1A depicts a high level view of a process that combines data elements using searching and similarity scoring to form a database of unique data elements.

Searching and similarity scoring is the process of determining how similar or dissimilar data is to a user's search criteria. In the present system, the data to be searched and similarly scored (interchangeably called the source data, database, document or set of documents) are assigned a numerical score that is a quantitative measure of the similarity between the data and search criteria. The data to be searched and similarly scored may be entered by the user, may be in a single stored document or may be embodied in a database containing many documents. Throughout the description of the drawings, it is assumed that the database contains multiple documents or entries to be searched. However, searching can also be done on a single document or entry. Searching and similarly scoring may also be done on data that is entered by the user, rather than data that has been previously stored in a database. Most databases that contain information that a user wants to search and score are relational databases, however the present system provides for searching of all types of databases by allowing the user to map between the categories to be searched and the fields of the source database. The present invention translates the data to be searched, whether it is entered by the user or stored in a relational database, into a hierarchical form and stores that data in hierarchical database, which has a tree-type structure with parent and child objects or nodes on the tree. The tree-type structure may be organized into a hierarchy of parent and child nodes that are root, interior and leaf nodes. A root node is a node that has no parent and the root node is a parent of at least one child node which may be an interior node or a leaf node. An interior node has a parent node and the interior node is itself a parent node having at least one child node, which may be an interior or a leaf node. A leaf node is a child node that has no children and the leaf node has a parent node, which may be either a root node or an interior node. The leaf nodes contain the data items that are to be searched and assigned a search score that represents how similar or dissimilar the data item is to the search criteria.

In the present system, the hierarchical database is stored in a data description language called Extensible Markup Language (XML) together with indexing structures called bands. XML is a World Wide Web consortium standard that allows for the creation of tags that identify data. XML encapsulates data inside custom tags that carry semantic information about the data. The tags describe each piece of data. Since the tagging categories may be standardized, XML facilitates the interchange of data. Other languages, besides XML that support and model data hierarchically can also be used.

A schema is a model of the problem domain. It contains only structural and other kinds of meta-data. A schema associated with hierarchical documents exists to give us a roadmap to be able to understand the hierarchical organization of the document. It forms a series of parent and child relationships or categories arranged in a hierarchical tree-type structure (of root, interior and child nodes) that correspond to the objects in the database or document that the user is interested in searching and scoring. For example, a simple schema that defines a person could have person as a root node with interior nodes of name, address and description. The interior nodes could then have leaf nodes that contain the actual data. The interior nodes name could have leaf nodes honorarium, first name, middle initial, last name and description. Another schema could contain attorney names and another could contain physician names. The schema does not contain the actual data items to be searched but simply represents the hierarchy of the data to be searched.

Turning now to FIG. 1A, FIG. 1A shows a system and method for maintaining a unique database of elements 100. It involves joining two sets of data that may be described with the same or different identifiers. A search and similarity-scoring engine 110 within a process workflow is used that allows for the creation and maintenance of a unique database 115. In this process, when new candidate data elements 105 are entered into the system, a similarity comparison is made between the candidate data elements 105 and the elements already in the database 115. If the elements match within a scoring threshold, the elements, which can be specified by the system and or by the user, are not candidates for entry into the database 115. If the elements do not match within a scoring threshold, they are not considered to be duplicates and, a secondary review process may be invoked to verify that the candidate data element 105 to be added to the database 115 is in fact a unique entry in the database 115. If the data element does not again match within a similarity scoring threshold, the data element is considered to be a new or unique item 120, and is added to the database 115. Upon a comparison of searching and scoring all candidate data elements, what is left in the database 115 is a unique collection of data elements.

Figure 1B:
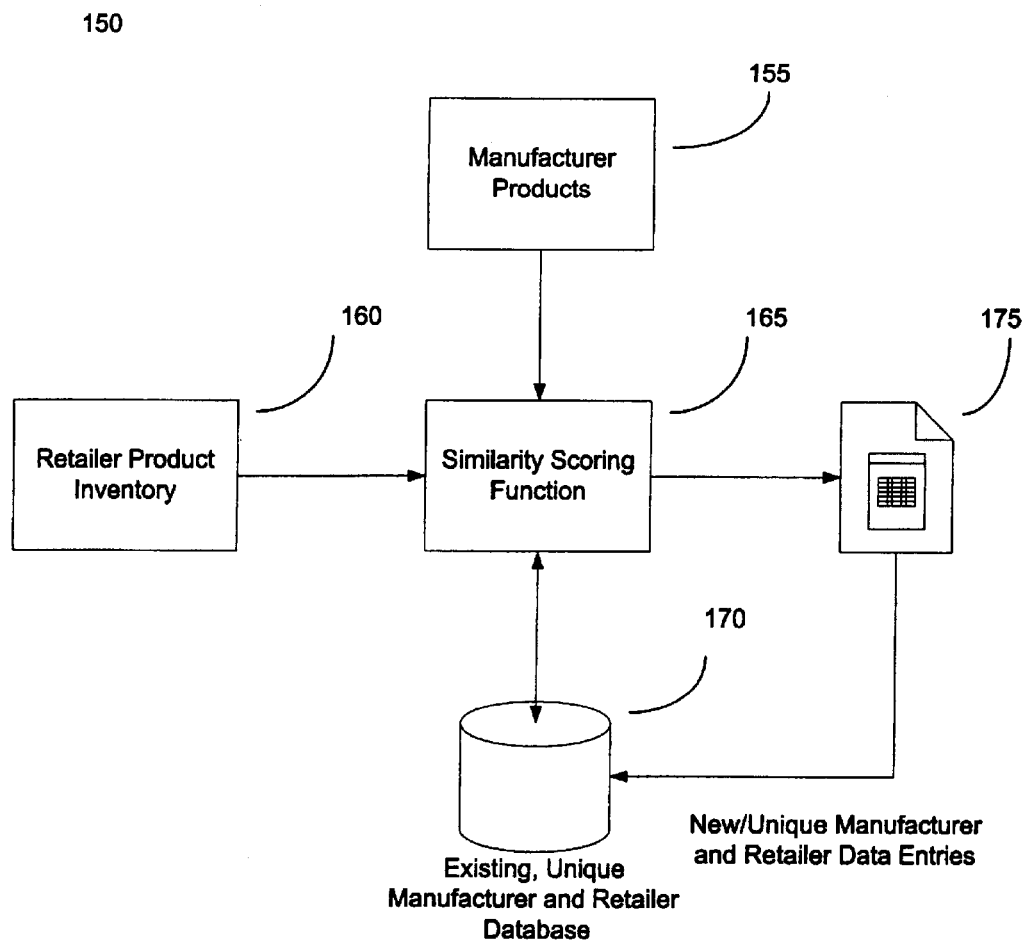
FIG. 1B depicts a high level view of a process that combines manufacturer products into a unique product manufacturer and retailer inventory database.

Turning to FIG. 1B, FIG. 1B is similar to FIG. 1A except it shows a solution 150 to this problem that involves using a similarity comparison 165 within a process workflow that allows for the creation and maintenance of a unique manufacturer product and retailer database 170. In this process, when new manufacturer products 155 are entered into the system, a similarity comparison 165 is made between the updated products 155 and the products already in the database 170. If the products 155 match within a similarity threshold, the products 155, which can be specified by the system and or by the user, are not candidates for entry into the database 170. If the products 155 do not match within a threshold, they are not considered to be duplicates and, a secondary review process is invoked to verify that the product to be added to the database 170 is in fact a unique entry. If the element does not match within a similarity threshold, the candidate data product is a new and unique item 175, and is added to the database. The same process is repeated when adding updated retailer product information 160 to the database 170. Upon a similarity comparison of all new and updated information, what is left is a unique collection of manufacturer product and retailer information contained in the database 170.

Figure 2:
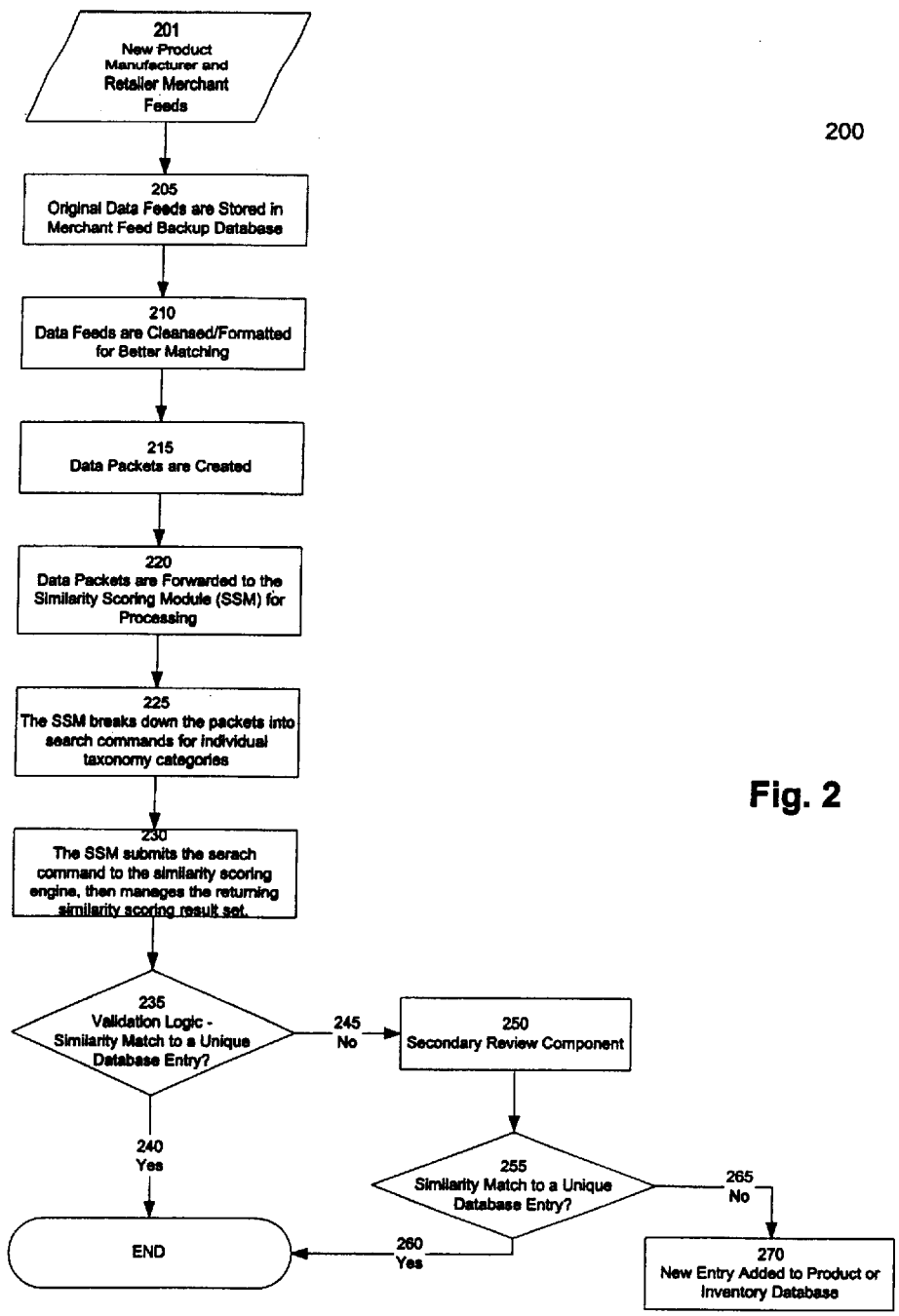
FIG. 2 is a flow diagram of the method of processing an entry to determine if is should be added to a unique product manufacturer and retailer inventory database.

Turning now to FIG. 2, FIG. 2 shows a flow diagram 200 for processing data feeds that are attempting to be added to a unique product manufacturer and retailer inventory database. New and updated manufacturer product and retailer inventory data feeds 201 are introduced to the system. The data feeds 201 can be in various types of databases including, but not limited to, relational database, hierarchical database, for a network database, or a text file. An entry may be introduced by a user through a user interface such as a GUI. The data feed may be in any computer language or format such as Extensible Markup Language (XML), ASCII, and binary formats. Before any action is performed on the data, a backup is entered into a merchant feed database 205. A series of data formatting, cleansing, and standardizing routines 210 are performed on the data in order to maintain a more homogenous set of defined data instances. Once the data manipulation techniques are employed, packets of data are created 215 within a matching module based upon a categorical product taxonomy. Each of the data packets pertains to a product category for either product manufacturers or retailers. As each data packet is compiled, they are forwarded to a search module for further processing 220.

Within the search and similarity scoring module, a search command is formulated for each new or updated data entity, based upon the taxonomy category to which the new data belongs to 225. The search command is then sent to the search and similarity scoring engine 230. Upon receiving the search command, the search and similarity scoring engine performs a query within the specified category in order to determine the similarity between the new data entity and the data contained in the unique manufacturer product and retailer database. Once the search and similarity scoring engine returns a result set of database entities, some validation logic is then employed 235. The validation logic works as a similarity score tolerance level in which to group new data entities as similar or dissimilar 235. If the new data entity is in fact similar to an existing data element, the new element is then discarded, thus maintaining a unique database 240. If the new data element is classified as not similar to an existing database entity 245, the new data element is then forwarded onto a secondary review component 250. The secondary review component 250 is responsible for the second-tier validation logic for determining unique data entity additions to the database. The secondary review component will then classify items as unique or duplicate data entity entries 255. If the secondary review component determines that the new data entity is in fact similar to an existing data element, the new data element is discarded and not added to the unique database 260. If the secondary review component determines that the data entity is in fact unique, and not similar to any other data elements in the database 265, the new information is then accepted and added to the unique manufacturer product and retailer database 270. The new data entity can then be added to any other database that attempts to maintain a unique product and inventory database.

Figure 3:
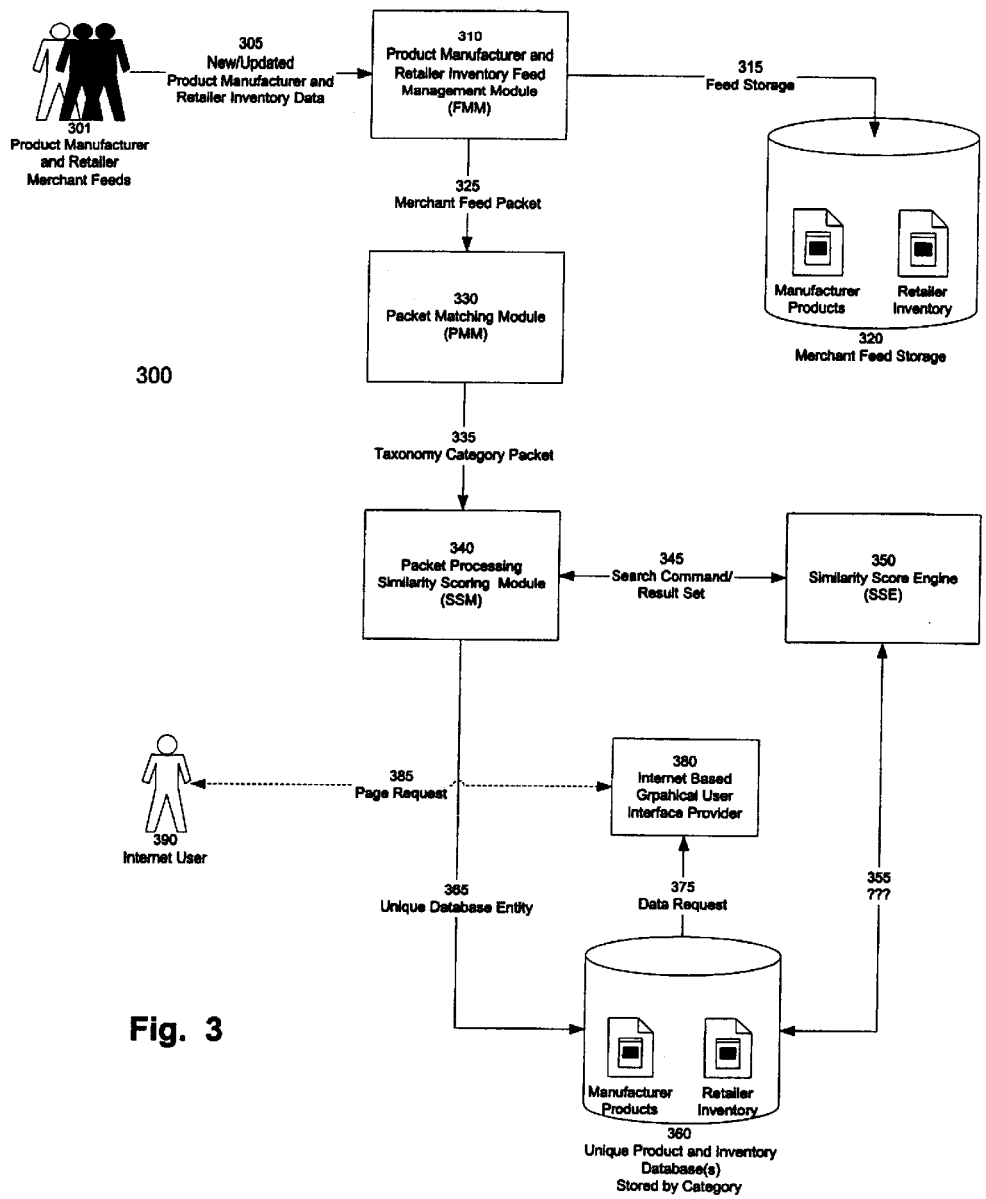
FIG. 3 is an architecture diagram of one embodiment of the system for processing an entry to determine if it should be added to a unique product manufacturer and retailer inventory database.

Turning now to FIG. 3, FIG. 3 shows an architecture diagram 300 for processing data feeds that are attempting to be added to a unique product manufacturer and retailer inventory database. Initially, data feeds are received from merchants either periodically or asynchronously 301. Within these data feeds may be new, updated, or duplicate data elements 305. The data feeds are managed, maintained, and manipulated through a Feed Management Module (FFM) 310. The FMM 310 can either take data directly from a database that is loaded into the system, or data can be fed to it via a web crawler that can extract data from web sites. In addition, the FMM 310 can format and standardize data structures for better compatibility with the rest of the system. Once data is received by the FMM 310, a copy of untouched data is then forwarded 315 to a data feed backup database 320. Within the data feed backup database 320, a copy of each data feed is stored and maintained in the event of any failure in the process. When the FMM 310 has properly backed up and prepared the data, the merchant data feed 325 is then forwarded on to the Packet Matching Module (PMM) 330 for the next phase of processing.

The PMM 330 is responsible for organizing numerous merchant data feeds into various taxonomy categories.

Periodically, the new packets categorized by taxonomy are then bundled and forwarded 335 on to the Search and Similarity-Scoring Module (SSM) 340 for the next phase of processing. Within the SSM 340, the data packets that contain information from many merchants for a given taxonomy category are then processed to determine whether they are unique to the database or not. Similarity score commands 345 are formulated and then sent to the Similarity Scoring Engine (SSE) 350 for performing a comparison of the data 355 within the unique product and inventory databases 360. The SSE 350 is then responsible for interpreting score commands, performing the comparisons, and returning a resulting set of similar data elements 345 to the SSM 340. With the resulting set of data entities, a determination can be made by the SSM 340 whether the new data entities contained in the packet are unique, or similar to existing products.

Upon determining that the new data element is actually a unique database entry 365, the data element is then forwarded to the unique manufacturer product and retailer databases 360. The unique data element may then be added to the collection of unique manufacturer and retailer database entities 360. Once a unique set of data has been established and maintained, a graphical user interface (GUI) 380 is used to retrieve information 375 from the database. The GUI 380 may display the unique data in a number of formats. The display may be geared toward presenting the data for a particular end-user application such as comparison-shopping, product manufacturer information, and product retailer information services, and inventory. A page request 385 to extract data from the unique product and inventory databases can then be specified by a user 390 through a page request 385 sent to the graphical user interface 380. Once a page request 385 has been sent to the graphical user interface 380, data extracted commands (data requests) 375 are prepared to retrieve data from the unique collection of data 360.

Data feeds are periodically received from product manufacturers and product retailers. These two types of data feeds are collectively known as merchant data feeds 301. These merchant data feeds may be gathered either manually via data extraction or in an automated fashion such as using a web crawler to extract data from online retail databases. When receiving these merchant data feeds, the Feed Management Module (FMM) 310 is used in order to collect and process the incoming data feeds 301.

Figure 4:
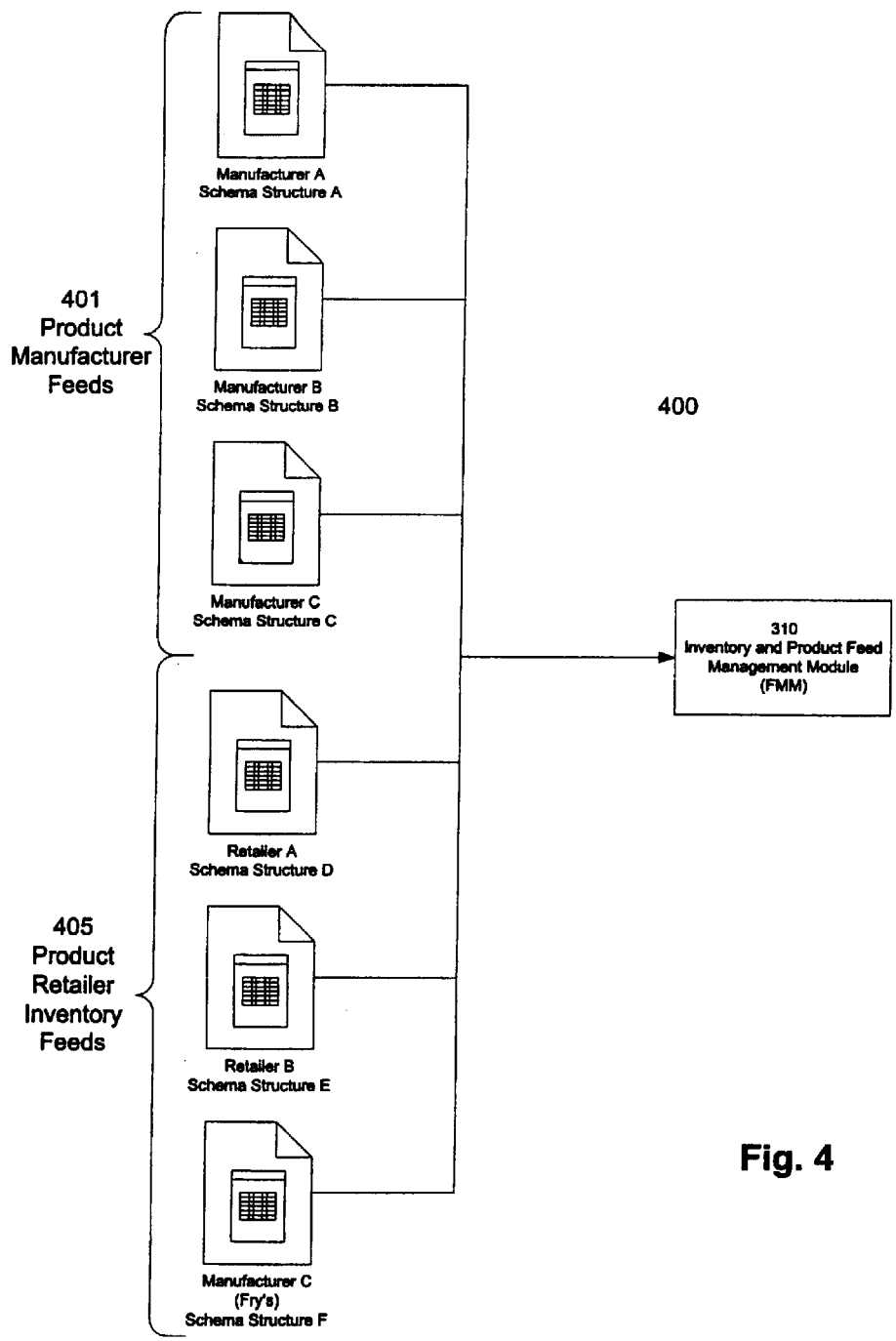
FIG. 4 is a diagram of the processing of data feeds from various types of merchants.

Turning now to FIG. 4, FIG. 4 shows the processing of data feeds 400 from various types of merchants. Within the various merchant data feeds, data may come in many different database schema formats, such as schemas designed for manufacturers 401, and schemas designed for retailers 405. These feeds are processed by a feed management module (FMM) process 310 as detailed in FIG. 3 and FIG. 5. In addition, merchant databases usually contain differing product identification, and product description styles for the same type of manufacturer and retailer data. This presents a problem when attempting to create a unique product manufacturer and retailer database. Products are often presented with different identifiers when they are actually the same product.

Figure 5:
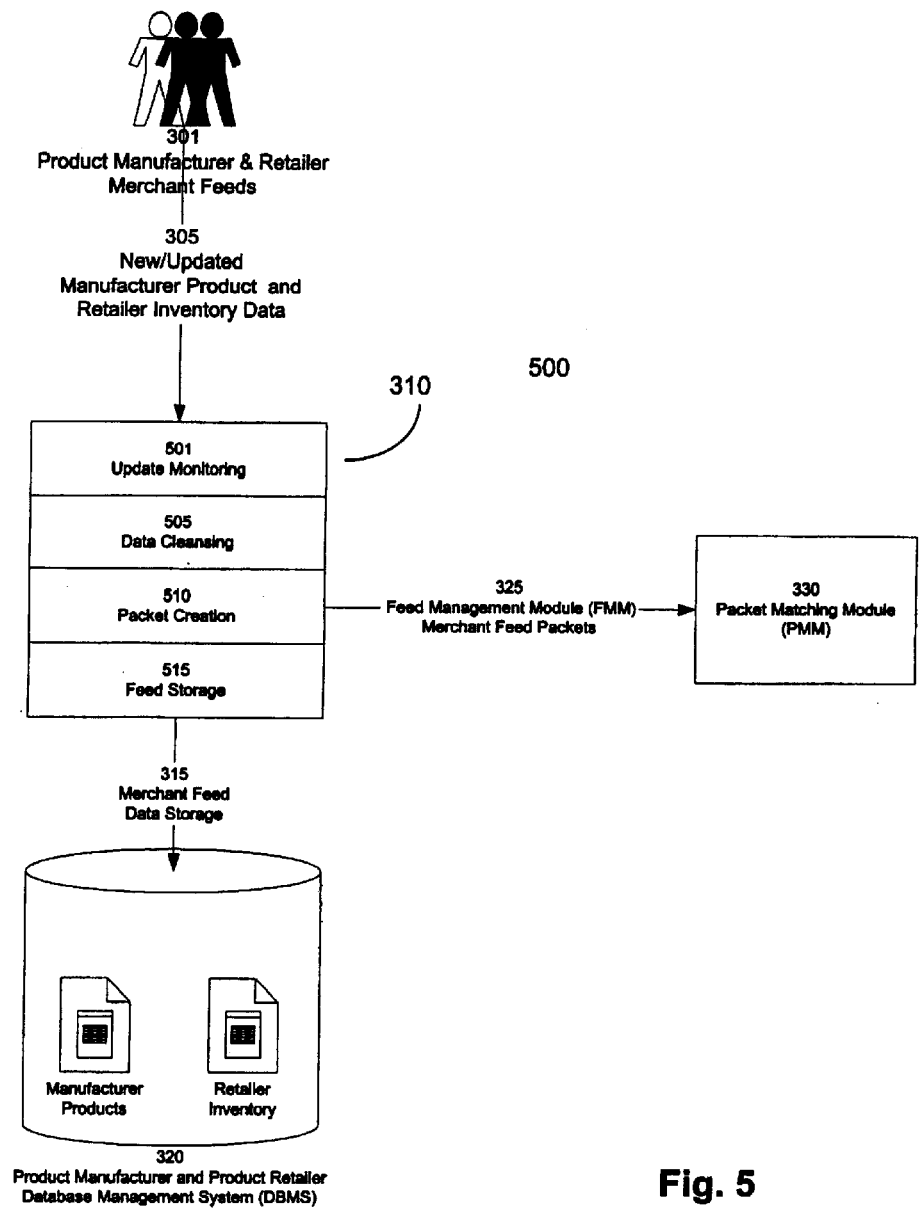
FIG. 5 is a diagram of the architecture related to the product inventory and data Feed Management Module (FMM) for managing and preparing merchant data feeds.

Turning now to FIG. 5, FIG. 5 shows the architecture 500 related to the product inventory and data Feed Management Module (FMM) 310 for managing and preparing merchant date feeds. The Feed Management Module (FMM) 310 is responsible for all data that enters the current system via merchant data feeds 301. As merchant data feeds are received from product manufacturers and product retailers, the FMM performs a number of functions in preprocessing the data 305. The first function of the FMM 310 is to monitor a number of different data feeds so that it can determine when the data feeds have been updated 501. As soon as data is accepted into the FMM 310, a backup copy of the unaltered data feed is prepared to be stored in a backup database 310 by the feed storage component 515. The data feed is then added to the product manufacturer and product retailer database management system (DBMS) 320.

After the data feeds have been successfully backed up, the next processing phase in the FMM 310 is known as the data-cleansing step 505. Data cleansing 505 is the act of altering data, and its structure in order to make data more usable in a database management system. In this particular case, data cleansing 505 is used to catch known product identification, manufacturer, and description misrepresentations. In addition, the data-cleansing phase 505 may alter the structure of a database schema in order to facilitate the sharing of data between databases. Once the data cleansing routines 505 are completed, the merchant data feed is then formed into a merchant data feed packet 510.

A merchant data feed packet 510 is a logical grouping of merchant feed data. The merchant feed data 305 can contain information from either product manufacturers or retailers for the various products they manufacturer or sell. In addition, the merchant data feed packet 510 can contain information across many taxonomical categories of the products that are provided by the merchants. When the merchant data feed packet 510 has been processed through the data cleansing routines 505, it is now ready for further processing. The merchant data feed packet 510 is then forwarded 325 to the Packet Processing Module (PMM) 330 for further processing into taxonomical categories.

Figure 6:
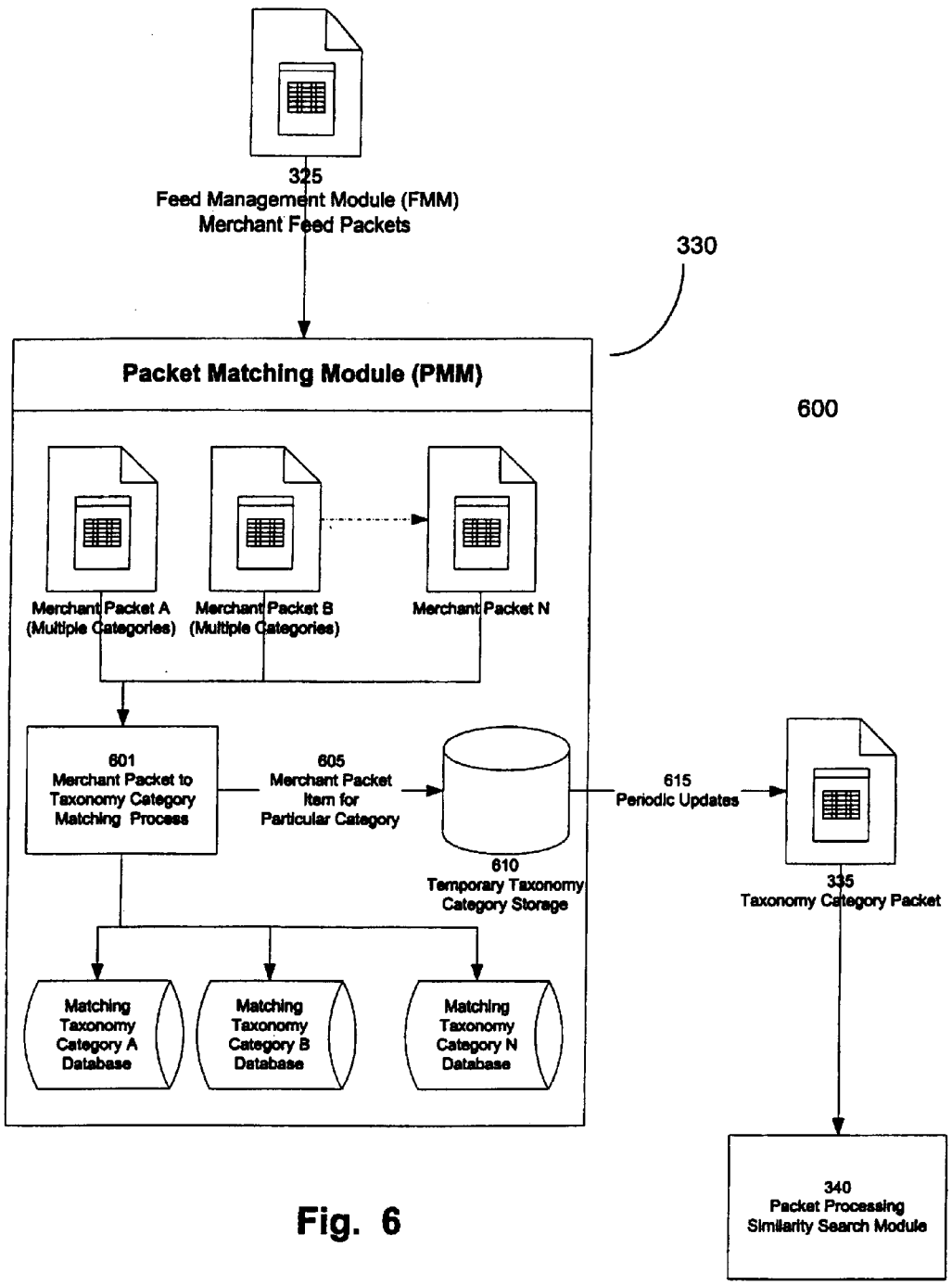
FIG. 6 is a diagram of the architecture related to the Packet-Matching Module (PMM) for further processing of merchant feed data.

Turning now to FIG. 6, FIG. 6 shows the architecture related to the Packet Matching Module 330 processing of merchant feed data in order to aid in the search process is depicted. The Packet Matching Module (PMM) 330 is responsible for transforming a merchant data feed packet into a taxonomy category packet to be used in a search command. The process begins by the Feed Management Module (FMM) 325 passing a merchant data feed packet 325 to the PMM 330. Once the packet 325 is received by the PMM 330, a process begins to match up the information contained in the merchant data feed packets 325 to taxonomy categories contained within the Similarity Scoring Engine databases. Each item contained in a packet 325 is separated, and then a matching process is performed to find the taxonomical category for which the merchant data feed packet item belongs to 601. When a match is made, the merchant data feed item 605 is put in a respective temporary storage entity 610 so that the data feed packet items 325 can be collated. At periodic intervals, updates 615 are forwarded to the Similarity Scoring Module (SSM) 340 for packet processing. Each one of these updates contain information for a separate taxonomy category packet 335 and the information being stored within the category by the temporary storage entity 610 in the PMM 330.

Figure 7:
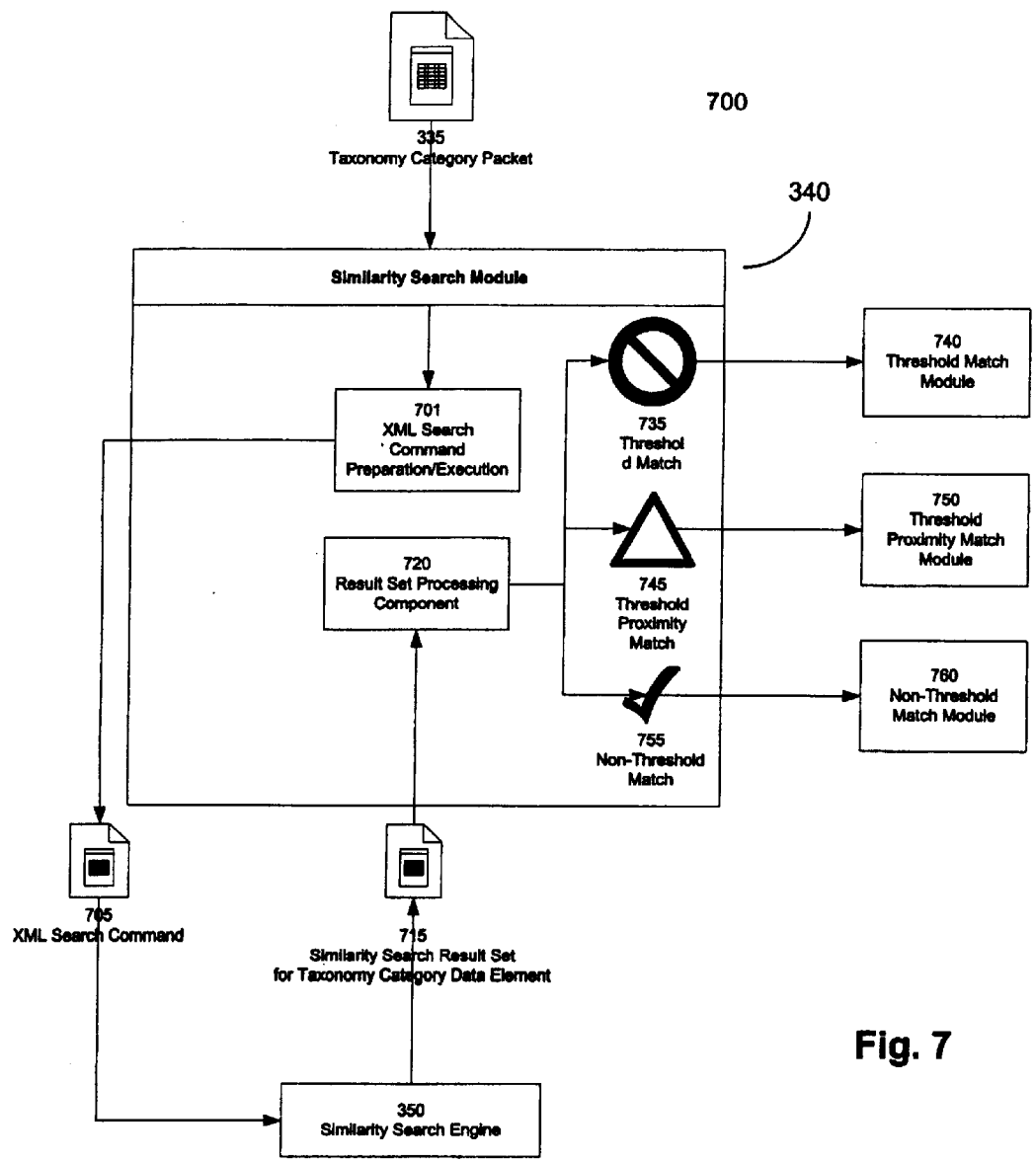
FIG. 7 is a diagram of the architecture related to the Search Scoring Module (SSM) processing for interpreting information packets provided by the Packet Matching Module and formulating search commands from the packets.

Turning now to FIG. 7, FIG. 7 shows the architecture 700 related to the Similarity Scoring Module 340 processing for interpreting information packets provided by the Packet Matching Module and formulating search commands from the packets. The Similarity Scoring Module (SMM) 340 is responsible for creating score commands from the individual data elements that are contained in a taxonomy category packet 335. The SSM 340 receives a taxonomy category packet 335 that has been collated by the Packet Matching Module (PMM)330. The SSM 340 then dissects the taxonomy category packet 335 and creates a series of XML similarity score commands 701 for the individual data elements that are contained in the taxonomy category packet. After creating the similarity score command 701, the command is executed by submitting the command 705 to the Similarity Scoring Engine (SSE) 350.

Once the score command 705 has been received by the SSE 350, the SSE 350 interprets the score command 705 and performs the given similarity scoring upon one of its member taxonomy category databases. The resident taxonomy category databases contain information pertaining to any one taxonomy category of information. These taxonomy categories can be aggregates of other categories, such as appliances, or can be an individual product category, such as refrigerators. Once the search has been performed within the particular database, the product of this process is what is known as a similarity score result set 715. A similarity score result set 715 contains the score command and all of the score results that pertain to the original score criteria. This information is returned in a markup language document such as XML, so that other components can then interpret the search results. From the similarity score result set 715, other components can perform desired actions based on specific interpretations of the search results 715.

For the current invention, similarity score results 715 are interpreted by a result set processing component 720. The result set processing component 720 interprets the search result sets and applies a set of preprogrammed logic instructions in order to maintain a unique product and inventory taxonomy. The logic for interpreting score results comes in the form of threshold tolerances for filtering the incoming results sets 715.

For any data entities that are contained in the similarity score result set 715, three different filtering mechanisms may be applied: a Threshold Match Determination, Proximity Match Determination, and a Non-Threshold Match Determination. Depending on how the search result set is scored and the score tolerances used in the determination, the result will be filtered into one of the three categories.

For the category Threshold Match Determination 735, a threshold match means that the similarity score result set 715 has criteria contained within that matches within a predefined percentage plus the proximity match tolerance to another data element contained in a specific taxonomical category database 735. The determination is made by comparing the similarity score result set to the search tolerance level plus the threshold match tolerance level. In one embodiment, there may be a threshold match if:

Similarity Score Result Set Score>(Score Tolerance+Proximity Match Tolerance)

For example:
Score Tolerance=60%
Proximity Match Tolerance=±10%
Threshold Match>(60%+10%)

Other methods of calculating the threshold match are possible. Once a positive threshold match determination has been made, the similarity score result set 715 is then sent to the Threshold Match Module 740 for further processing.

For the category Proximity Match Determination 745, a proximity match denotes that a similarity score result set 715 has criteria that fall within a specified proximity match threshold to or from the similarity score result tolerance level within the taxonomy category database 745. The determination is made by comparing the similarity score result set score to the search tolerance level plus and minus the threshold match tolerance level. If the similarity score result set score falls in between the tolerance range, there is a valid proximity match. In one embodiment for example, there is a proximity match if:

Similarity Score Result Set Score<(Score Tolerance+Proximity Match Tolerance), or Similarity Score Result Set Score>(Score Tolerance−Proximity Match Tolerance)

For Example:

Proximity Match=[Search Result Set Score<(60%+10%)], or [Search Result Set Score>(60%−10%)]

Other methods of calculating the proximity match are possible. Once a positive proximity match determination has been made, the similarity score result set 715 is then sent to the Proximity Match Module 750 for further processing.

For the category Non-Threshold Match Determination, a non-threshold match denotes that a similarity score result set has criteria that does not meet the definition of a match within the taxonomy category database 755. The determination is made comparing the similarity score result set score to the score tolerance level minus the threshold match tolerance level. In one embodiment, there may be a non-threshold match if:

Similarity Score Result Set Score<(Score Tolerance−Proximity Match Tolerance)

For example:

Threshold Match<(60%−10%)

Other methods of calculating the non-threshold match are possible. Once a positive non-threshold match determination has been made, the similarity score result set is then sent to the Non-Threshold Match Module 760 for further processing.

Figure 8:
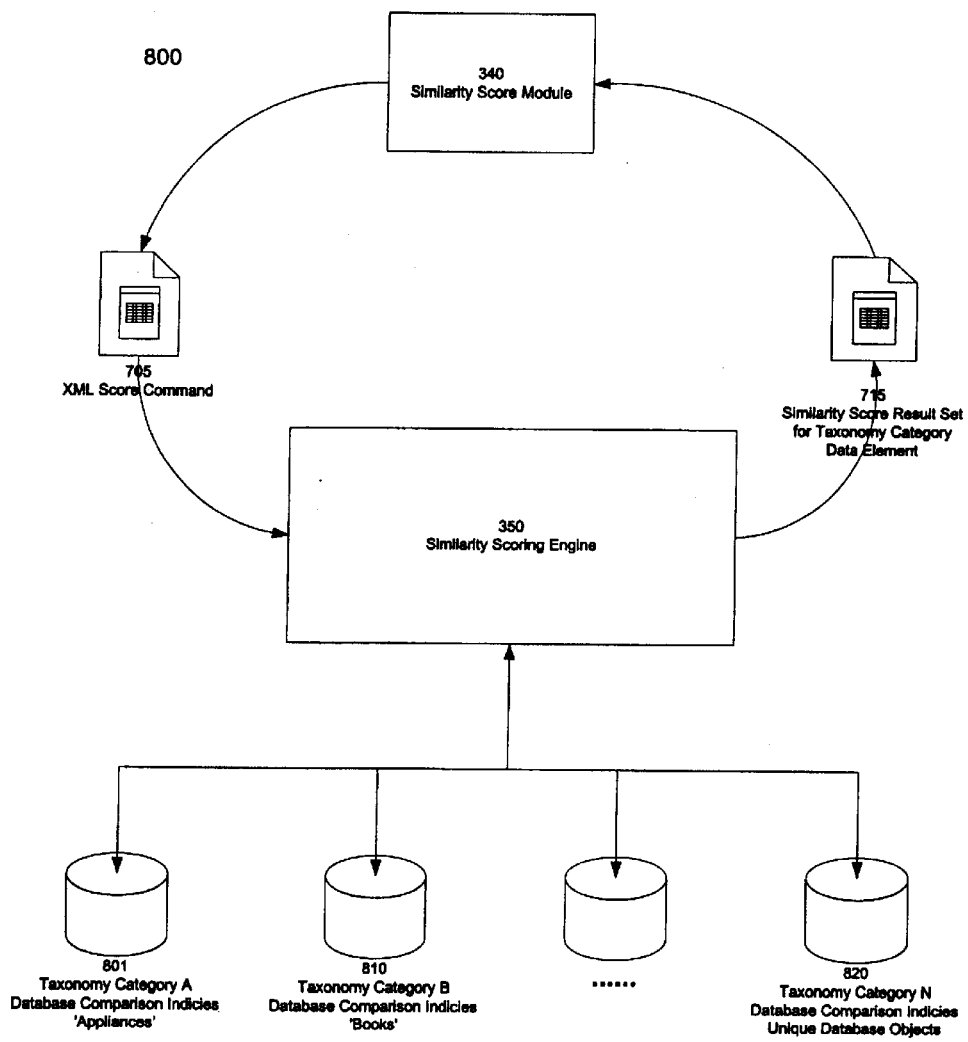
FIG. 8 is a diagram of the architecture related to the search processing for facilitating comparison of new merchant data feeds to a unique product manufacturer and retailer inventory database.

Turning now to FIG. 8, FIG. 8 shows the architecture 800 related to how the Similarity Scoring Engine 350 facilitates the comparison of new merchant data feed elements to a unique product manufacturer and retailer inventory database. The Similarity Scoring Engine (SSE) 350 is responsible for interpreting score commands 705, searching the data in specific taxonomy category databases 801, 810, 820, and then returning a set of results 715 that are similar to the submitted score command. A score command is formulated and prepared by the Similarity Scoring Module (SSM) 340. Once the score command 705 has been prepared in a format that can be interpreted by the Similarity Score Engine (SSE) 350, it is submitted to the SSE 350 over a local, distributed, or global communications network.

Once the SSE 350 receives the score command 705, it is parsed and interpreted for the specific commands it contains. Once the commands have been interpreted, the SSE 350 then prepares to execute the score commands in the taxonomy category database specified. Once the SSE 350 begins executing the search command 705, the search criteria, specified in the search command is then searched against all of the data elements in the database. The search criteria can be a plurality of data elements grouped hierarchically or flat, depending on the taxonomy category database. Each element in the search criteria is searched against every element contained in each grouping, or document, of data.

When an element is compared to another element, a specific comparison algorithm is employed. The comparison algorithm contains the logic to compare two sets of information. Once the two sets of information has been compared against each other, the comparison algorithm arrives at a 'degree' of similarity score value. Some examples of the types of comparisons are name, address, date, phone, date, currency, text, numeric, product name, product code, identification number, and the Unit Price Code (UPC). The SSE 350 then combines the information from the specific data element comparisons and arrives at a total similarity score for each data grouping in the system that was compared to the search criteria provided.

Specifically, the SSE 350 takes in a score command 705, which may be a manufacturer or retailer product. It searches the designated database to determine whether there are data entities already contained in the system that are similar to the score criteria. A comparison is made on each data element that is contained in the data entity, then a comparison similarity score is provided. The aggregate of these scores, including specific score weighting for each element is factored together and a total comparison similarity score is determined. The conglomerate of each data entity total comparison similarity score to the search criteria is known as a similarity score result set 715.

Once a similarity scoring has been conducted, a similarity score search result set 715 is packaged into a transportable format such as Extensible Markup Language (XML), Hypertext Markup Language (HTML), Binary, ASCII Text, or any other markup language or data storage medium. The similarity score result set 715 is then returned to the module that submitted the original score command. In this example, the similarity score result set 715 is returned to the Similarity Scoring Module (SSM) 340.

To facilitate the process of maintaining a unique product and inventory taxonomy, data is broken down and distributed across many categories, aggregates of categories, and hierarchies of categories 801, 810, 820. The separation of the unique product inventory taxonomy data facilitates the ability to process large amounts of data in a fixed period of time. Typically, taxonomy categories are sub-divided if the amount of data contained within the database becomes too large. At that point, a taxonomy category is subdivided and moved into a new taxonomy category database.

Figure 9:
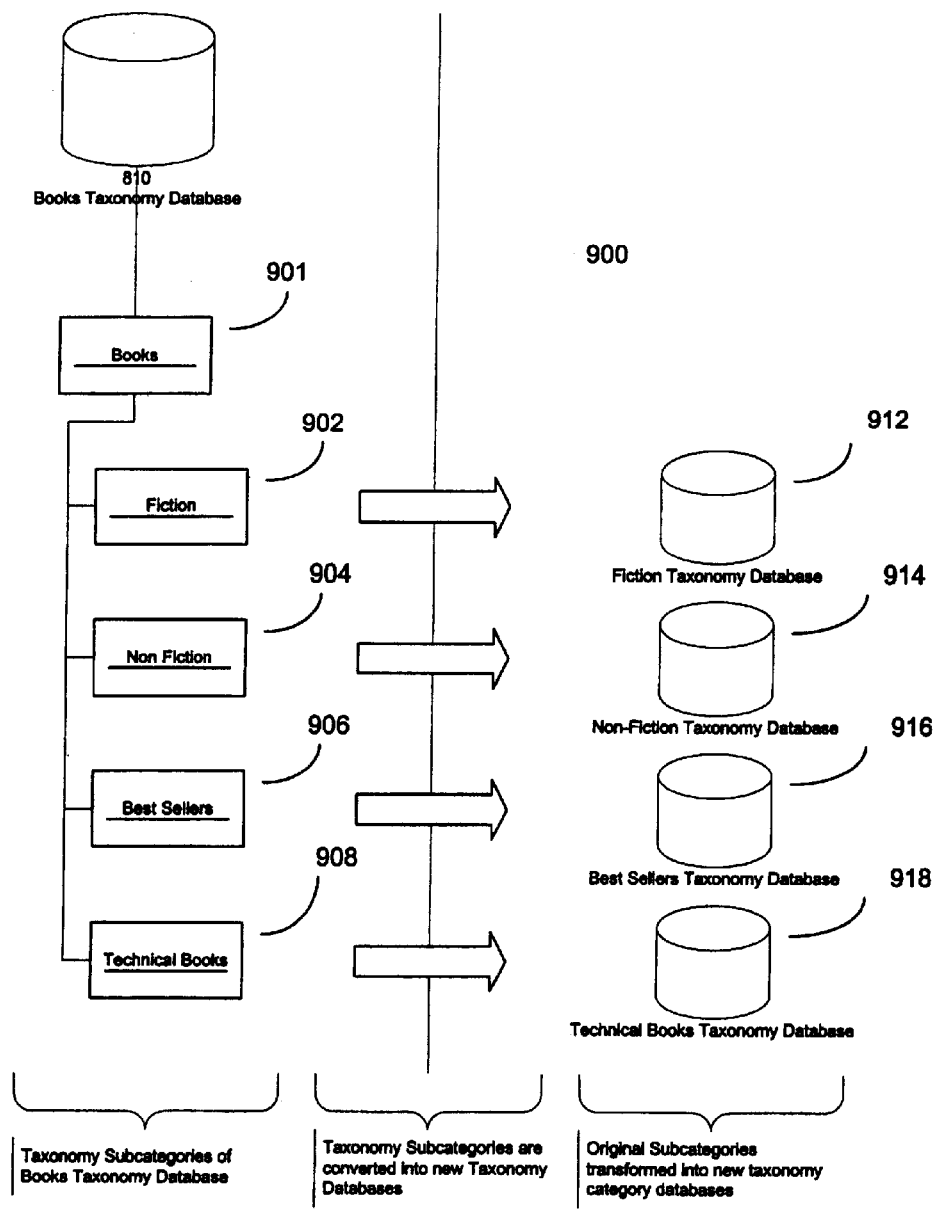
FIG. 9 is a diagram of the process of subdividing a product taxonomy into categories of data that can be more sparsely distributed amongst taxonomy categories.

Turning now to FIG. 9, FIG. 9 shows a diagram 900 of how a product taxonomy may be subdivided so that data can be more sparsely distributed amongst taxonomy categories. For example, a taxonomy category may exist that represents books 901 which may be comprised of sub categories fiction 902, non-fiction 904, best sellers 906, and technical books 908. If the books database 810 becomes too large to adequately perform the comparisons needed to maintain the unique taxonomy within a period of time, the sub categories 902, 904, 906, 908 may then be segmented into to their own unique taxonomy database 912, 914, 916, 918.

The end result of this process is separate taxonomy databases 912, 914, 916, 918 for each of the former taxonomy database categories 902, 904, 906, 908.

Figure 10:
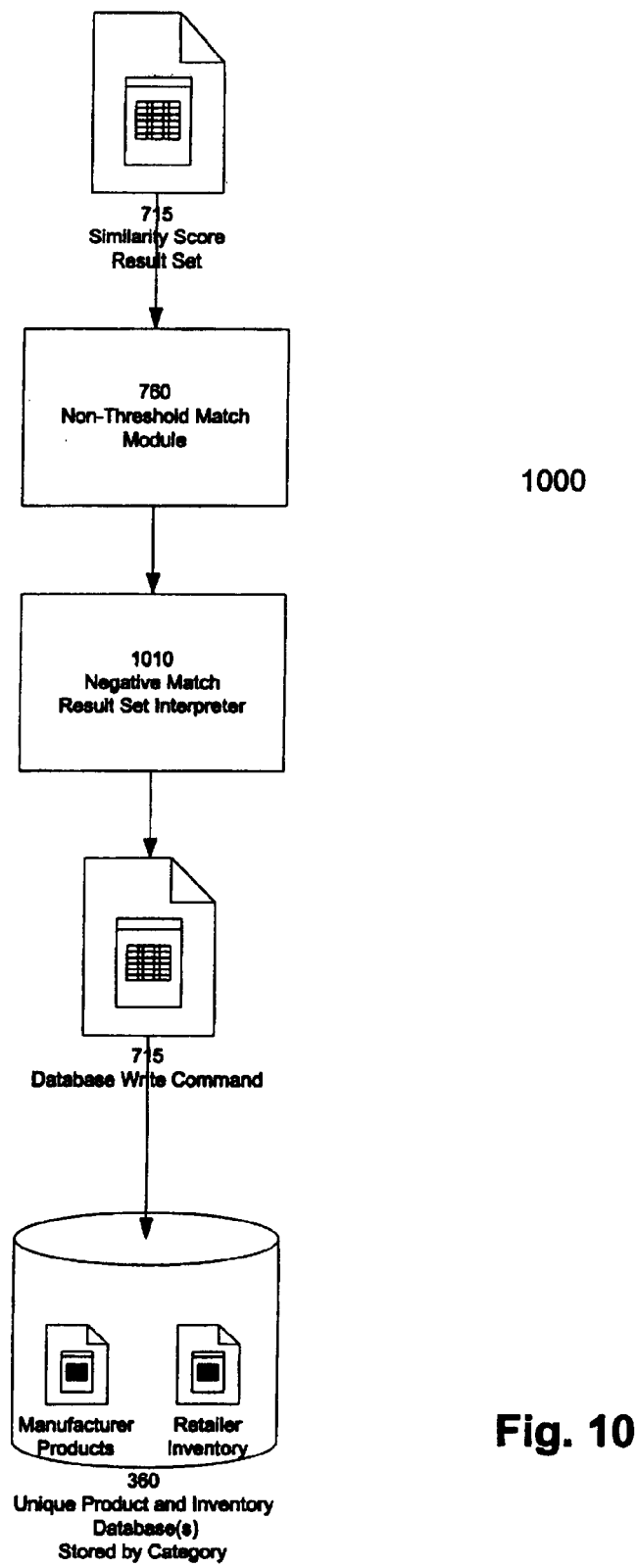
FIG. 10 is a diagram of the processing of the Non-Threshold Match Module (NTMM)

Turning now to FIG. 10, FIG. 10 shows a diagram 1000 of the Non-Threshold Match Model 760 processing (NTMM), which handles a non-threshold comparison match 755 as shown in FIG. 7. The Non-Threshold Match Module 760 is responsible for processing a similarity score result set 715 that does not meet the criteria of having similar data to the data that already exists in the unique taxonomy database 360. There may be many methods for processing a search result set 715 that contains non-threshold match information. Actions stemming from a non-threshold match may be adding new data entities to the unique taxonomy database 360, notifying retailers of new product additions, and creating separate data entities that contain new taxonomy category information.

To process a non-threshold comparison match 755, a number of generic steps are followed. First, a similarity score result set 715 is forwarded to a Non-Threshold Match Module 760 by the Result Set Processing Component 720. Once received, the Non-Threshold Match Module is responsible for implementing specific logic pertaining to the processing of a similarity scoring result set 715. The Non-Threshold Match Module 760 may employ many methods for processing a similarity score result set 715.

One specific implementation is to add the score criteria of the similarity score result set 715 to the unique taxonomy database 360. The process begins by forwarding the similarity score result set 715 to the Negative Match Result Set Interpreter 1010. The Negative Match Result Set Interpreter 1010 is responsible for processing a similarity score result set 715 by parsing the similarity score criteria and formulating the similarity score criteria into a format that can added to the unique taxonomy database 360. The similarity score criteria takes shape as a database write command 715, which may then be added to the unique taxonomy database 360. Once the similarity score criteria has been added to the unique taxonomy database 360, it can then be used in future comparisons so that duplicates of its own similar values cannot be added to the database.

Figure 11:
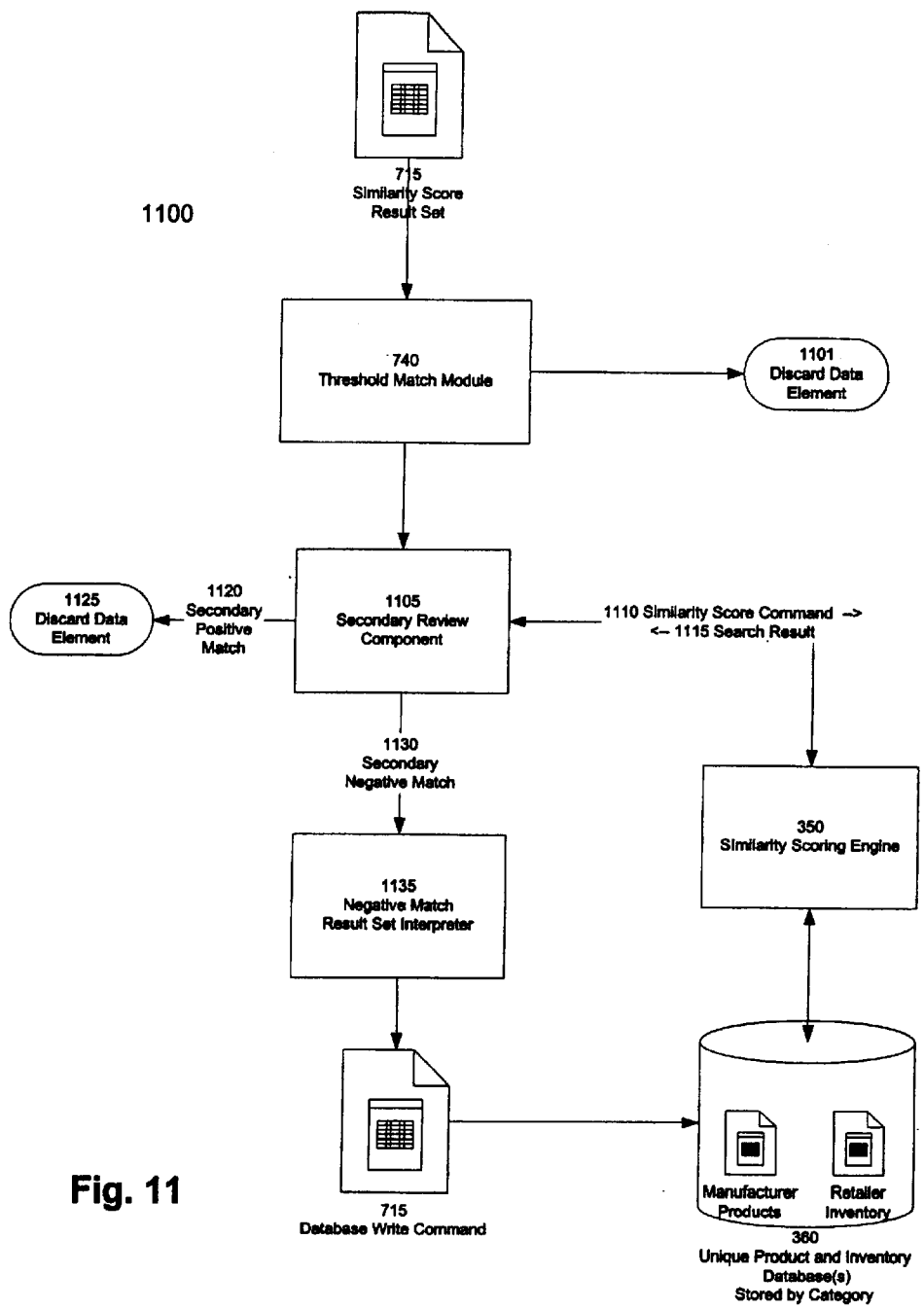
FIG. 11 is a diagram of the processing of the Threshold Match Module (TMM)

Turning now to FIG. 11, FIG. 11 shows a diagram 1100 of the Threshold Match Module (TMM) 740 processing for handling a comparison match 735 as shown in FIG. 7. The Threshold Match Module (TMM) 740 is responsible for processing a similarity score result set 715 that meets the criteria of having similar data to the data that already exists in the unique taxonomy database 360. There may be many methods for processing a similarity score result set 715 that contains threshold match information. Actions stemming from threshold match data may be disallowing the new data entity to be added to the unique taxonomy database 360, a secondary review process, addition of the data entity into a duplicates database, and use of the similarity scoring for enhancing data formatting and cleansing routines.

To process a threshold similarity comparison match 735, a number of generic steps are followed. First, a similarity score result set 715 is submitted to the Threshold Match Module (TMM) 740 by the Result Set Processing Component 720. The similarity score result set 715 may be immediately discarded 1101, or sent to a secondary review component 1105 by the TMM 740. Within the secondary review component 1105, a number of different methods may be employed to re-verify the accuracy of the similarity score result set 715. One method is to resubmit the same similarity score criteria, but with tighter comparison match parameters. Within this process, a similarity score command 1110 is sent to the unique taxonomy database 360. The score command 1110 may be formulated so certain data elements have different scoring measures, or different weight distributions amongst the set of data. Once the score command 1110 has been submitted to the Score Search Engine (SSE) 350, the SSE 350 processes the command and distributes the similarity score to the appropriate unique taxonomy database 360. When the scoring is complete, a secondary similarity score result set 1115 is returned to the secondary review component 1105.

Upon receiving the secondary similarity score result set 1115 within the secondary review component 1105, a decision is made to validate or discard the data values. For a secondary positive match 102, the data entity can be discarded 1125 so that the new data entity will not be allowed to be added to the unique taxonomy database 360. Other implementations might store the rejected values for further processing. When a negative secondary match is encountered 1130, the similarity score result set can then be sent to an interpreter 1135 so that the data can be added into the unique taxonomy database 360. The negative match result set interpreter 1135 is responsible for taking a similarity score result set 715, parsing the score criteria, and formulating the search criteria into a format that can added to the unique taxonomy database 360. The similarity score criteria takes shape as a database write command 715, which can then be added to the unique taxonomy database 360.

Figure 12:
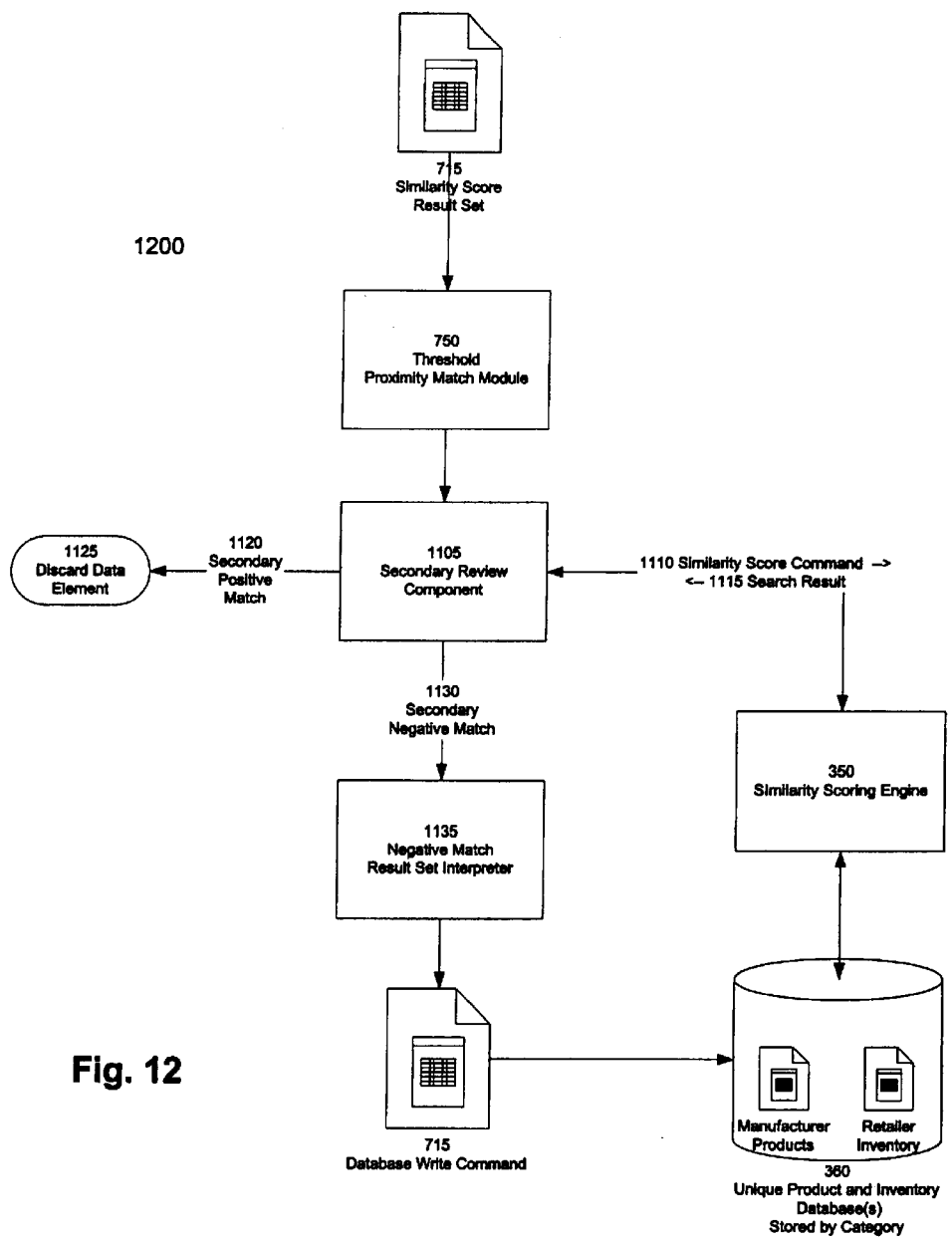
FIG. 12 is a diagram of the processing of the Threshold Proximity Match Module (TPMM).

Turning now to FIG. 12, FIG. 12 shows a diagram 1200 of the Threshold Proximity Match Module (TPMM) 750 processing for handling a threshold proximity comparison match in the system as shown in FIG. 7. The Threshold Proximity Match Module (TPMM) 750 is responsible for processing a similarity score result set 715 that meets the criteria that falls within a specific tolerance range of being similar. The TPMM 750 acts very much in the same way as the Threshold Match Module 740, but differing similarity score parameters may be needed to confirm or deny the presence of a match. In addition, there may be many methods of processing a similarity score result set 715 that contains threshold proximity match information. Actions stemming from threshold match data may be allowing or disallowing the new data entity to be added to the unique taxonomy database 360, a secondary review process, addition of the data entity into a duplicates database, and use of the matches for enhancing data formatting and cleansing routines.

To process a Threshold Proximity Match Comparison 745, a number of generic steps are followed. First, a similarity score result set 715 is submitted to the Threshold Proximity Match Module (TPMM) 740 by the Result Set Processing Component 720. The similarity score result set 715 may be immediately discarded 1201, or sent to a secondary review component 1105 by the TPMM 750. Within the Secondary Review Component 1105, a number of different methods may be employed to re-verify the accuracy of the search result set 715. One method is to resubmit the same similarity score criteria, but with tighter comparison match parameters. Within this process, a score command 1110 is sent to the unique taxonomy database 1110. The score command 1110 may be formulated so certain data elements have different comparison measures, or different weight distributions amongst the set of data. Once the score command 1110 has been submitted to the Similarity Score Search Engine (SSE) 350, the SSE 350 processes the command and distributes the similarity score to the appropriate unique taxonomy database 360. When the scoring is complete, a secondary similarity score result set 1115 is returned to the Secondary Review Component 1105.

Upon receiving the secondary similarity score result set 1115 within the Secondary Review Component 1105, a decision is made to validate or discard the data values. For a secondary positive match 1120, the data entity can be discarded 1125 so that the new data entity will not be allowed to be added to the unique taxonomy database 360. Other implementations might store the rejected values for further processing. When a negative secondary match is encountered 1130, the similarity score result set 1115 may then be sent to an interpreter 1135 so that the data can be added into the unique taxonomy database 360. The Negative Match Result Set Interpreter 1135 is responsible for taking a similarity score result set 1115, parsing the score criteria, and formulating the search criteria into a format that can added to the unique taxonomy database 360. The search criteria may take shape as a database write command 715, which can then be added to the unique taxonomy database 360.

The similarity scoring that is detailed throughout this document may be any type of similarity scoring that gives the results indicated above. Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A computer implemented method for combining data elements to build and maintain a unique database comprised of data entries, comprising:
    a. using at least one candidate data element that is a candidate to be added to existing data elements in the unique database, performing a comparison between the candidate data element and the existing data elements in the unique database;
    b. computing a similarity score that represents a similarity between the at least one candidate data element and the existing data elements in the unique database; and
    c. selecting the candidate data element as a candidate for entry into the unique database and entering the candidate data element into the unique database if the similarity score is equal to or less than a similarity score threshold.

2. The method of claim 1 further comprising determining if the candidate data element should be entered into the unique database based on the similarity score.

3. The method of claim 1 further comprising rejecting the candidate data element for entry into the unique database if the similarity score is greater than a similarity score threshold.

4. The method of claim 1 wherein the computing a score comprises:
   a. using a schema that represents the organization or structure of the unique database;
   b. developing a query containing at least one field, based on the schema;
   c. examining candidate data elements, wherein the candidate data element comprises at least one data field, and inputting at least one data field of the candidate data element into the query;
   d. searching the unique database for the contents of the query; and
   e. computing the similarity score.

5. The method of claim 1 wherein the computing the similarity score comprises:
   a. separating the unique database into at least one selected categories;
   b. developing a schema for the at least one selected categories;
   c. developing a query containing at least one field based on the schema for the at least one selected categories;
   d. assigning the candidate data element to at least one of the selected categories;
   e. inputting at least one data field of the candidate data element into the query;
   f. searching the unique database for the contents of the query; and
   g. computing the similarity score.

6. The method of claim 1 wherein the computing a similarity score comprises:
   a. separating the unique database with data elements or objects into at least one selected categories;
   b. developing a schema for the at least one selected categories;
   c. identifying the candidate data element as at least one of the selected categories;
   d. comparing the candidate data element to at least one of the selected categories of data elements of the unique database;
   e. computing the similarity score; and
   f. using the resulting similarity score to determine if the candidate data element should be added to the unique database.

7. The method of claim 1 wherein the computing a similarity score comprises:
   a. separating the unique database into at least one selected category;
   b. developing a schema for the selected categories;
   c. assigning the candidate data element to at least one of the selected categories;
   d. formulating a similarity score command for each candidate data element based on the selected categories to which the candidate data element belongs;
   e. sending the similarity score command to a similarity score function; and
   f. performing a search using the score command and the unique database whereby a similarity score result is returned from the search function that represents the similarity score between the at least one candidate data element and the existing data elements in the unique database.

8. The method of claim 7 wherein if the similarity score result indicates a similarity score exceeding the similarity score threshold level, the candidate data element is not added to the unique database.

9. The method of claim 7 wherein if the similarity score result indicates a similarity score less than or equal to a similarity score threshold level, the candidate data element is added to the unique database.

10. The method of claim 7 wherein if the search result indicates a match less than a threshold level, the candidate data entry is annotated as a unique element to be added to the unique database.

11. The method of claim 10 wherein the candidate data entry is added to the unique database.

12. The method of claim 10 further comprising selecting the similarity score result from the group consisting of similar and dissimilar.

13. The method of claim 12 further comprising if the similarity score result is similar, the candidate data element is not added to the database.

14. The method of claim 12 further comprising if the similarity score result is dissimilar, processing further comprises performing a validation to verify the candidate data element is unique and should be added to the unique database.

15. The method of claim 14 wherein the validation is selected form the group consisting of a manual validation and a computer automated validation.

16. The method of claim 14 further comprising if results of the validation indicate the candidate data element is unique, the candidate data element is added to the unique database according to its selected categories.

17. The method of claim 14 further comprising if results of the validation indicate the candidate data element is not unique, the candidate data element is not added to the unique database.

18. The method of claim 7 wherein the similarity score results, the candidate data element and the unique database are available for display to a user through a graphical user interface.

19. The method of claim 7 wherein the formulating, sending and performing occur in near real-time.

20. The method of claim 7 wherein the formulating, sending and performing occur in a background mode.

21. The method of claim 1 wherein the candidate data elements are in a format selected from the group consisting of text format, relational database format, hierarchical database format, extensible markup language (XML) format and hypertext markup language (HTML) format.

22. The method of claim 7 wherein the data elements are formulated in XML.

23. The method of claim 7 further comprising creating at least one XML similarity score command to compare the candidate data elements to the unique database and executing the similarity score command.

24. The method of claim 23 wherein execution of the similarity score command comprises:
   a. interpreting the score command by a similarity score function; and
   b. executing the similarity score command by the similarity score function and returning the similarity score results in a markup language.

25. The method of claim 23 further comprising processing a similarity score result set by interpreting the similarity score results and applying a set of programmed logic functions, including filtering mechanisms to filter the result set.

26. The method of claim 25 wherein the filtering mechanisms comprise a set of threshold tolerances selected from the group consisting of a threshold match, a proximity match and a non-threshold match.

27. The method of claim 26 wherein the threshold match occurs when the similarity score results returned is greater than the sum of a predefined percentage and a proximity match score.

28. The method of claim 26 wherein the proximity mach score is equal to the union of the set in which the similarity score result is less than a similarity score tolerance percentage (plus an additional percentage) and the set in which the similarity score results is greater than the similarity score tolerance percentage minus the additional percentage.

29. The method of claim 26 wherein the non-threshold match occurs when the similarity score result is less than the difference between the similarity score tolerance and the proximity search tolerance.

30. The method of claim 26 further comprising performing a threshold similarity score comparison match action that is selected from the group consisting of discarding the candidate data element, indicating the candidate data element is not to be added to the database and performing a secondary validation of the similarity score search result.

31. The method of claim 26 wherein performing a secondary validation comprises repeating the search with tighter comparison match parameters and returning a second similarity score result.

32. A computer-readable media containing instructions for controlling a computer system to implement the method of claim 1.

33. A computer-readable media containing instructions for controlling a computer system to implement the method of claim 7.

34. A system for combining data elements to build and maintain a unique database, comprising:
  a. candidate data elements;
  b. unique data elements contained in a database;
  c. a similar scoring engine for comparing the candidate data elements with the unique data elements;
  d. means for entering the candidate data elements into the database based on the comparison of the similar scoring engine; and
  e. means for entering the candidate data elements into the database if the similar scoring engine determines a similarity score result set that is less than or equal to a predetermined threshold value.

35. The system of claim 34, further comprising means for performing a secondary similar score validation check on the candidate data elements prior to entering the candidate data elements into the database.

36. The system of claim 34, wherein the candidate data elements are not entered into the database if the similar scoring engine determines a similarity score result set that is greater than a predetermined threshold value.

37. The system of claim 34, wherein the candidate data elements comprise manufacturers product listings and retailer product inventory.

* * * * *